(12) United States Patent
Burdette et al.

(10) Patent No.: US 8,110,277 B2
(45) Date of Patent: Feb. 7, 2012

(54) FUSED SILICA BLANK AND METHOD OF FORMING A FUSED SILICA PLATE FROM THE SAME

(75) Inventors: Steven Roy Burdette, Big Flats, NY (US); James Gerard Fagan, Painted Post, NY (US); Daniel Raymond Sempolinski, Painted Post, NY (US); Pattarin McLaren, Corning, NY (US)

(73) Assignee: Corning Incorporated, Corning, NY (US)

( * ) Notice: Subject to any disclaimer, the term of this patent is extended or adjusted under 35 U.S.C. 154(b) by 399 days.

(21) Appl. No.: 12/261,586

(22) Filed: Oct. 30, 2008

(65) Prior Publication Data

US 2009/0142547 A1    Jun. 4, 2009

Related U.S. Application Data

(60) Provisional application No. 61/004,879, filed on Nov. 30, 2007.

(51) Int. Cl.
*B32B 3/10* (2006.01)
*C03B 23/00* (2006.01)

(52) U.S. Cl. .......................................... 428/136; 65/105
(58) Field of Classification Search .................. 428/156
See application file for complete search history.

(56) References Cited

U.S. PATENT DOCUMENTS

2007/0059533 A1    3/2007   Burdette et al.

*Primary Examiner* — David Sample
*Assistant Examiner* — Laura Auer
(74) *Attorney, Agent, or Firm* — Robert P. Santandrea (57) ABSTRACT

A method of making a fused silica plate includes providing a fused silica blank having a length, a longitudinal axis, and an outer diameter. The method further includes forming a slot in the fused silica blank which extends from the outer diameter to a location at or offset from a center of the fused silica blank and is substantially parallel to the longitudinal axis of the fused silica blank. The slot is defined by a concave surface located at or offset from the center of the fused silica blank, a first side surface extending between a first edge of the concave surface and the outer diameter of the fused silica blank, and a second side surface extending between a second edge of the concave surface and the outer diameter of the fused silica blank. At least one of the first and second side surfaces are connected to the concave surface by a chamfered surface. The method further includes rolling out the fused silica blank having the slot to form a fused silica plate.

20 Claims, 11 Drawing Sheets

FUSED SILICA BLANK AND METHOD OF FORMING A FUSED SILICA PLATE FROM THE SAME

CROSS-REFERENCE TO RELATED APPLICATIONS

This application claims the benefit of priority under 35 U.S.C. §119(e) of U.S. Provisional Application Ser. No. 61/004,879 filed on Nov. 30, 2007.

FIELD

The invention relates generally to methods of making glass articles. More particularly, the invention relates to a process of reshaping glass articles.

BACKGROUND

High purity fused silica glass is typically made by a flame hydrolysis process, which may be a soot-to-glass process or a direct-to-glass process. Examples of soot-to-glass processes include chemical vapor deposition (CVD) processes such as outside vapor deposition (OVD), inside vapor deposition (IVD), and vapor axial deposition (VAD). Glass preforms made from CVD processes are typically in the form of a cylinder having a length-to-diameter ratio much greater than 1. These cylindrical glass preforms typically require reshaping into a plate or other flat configuration before further processing into optical elements such as lenses. Further, these cylindrical preforms tend to exhibit concentric, circular micro-striae due to variations in composition, e.g., β-OH concentration, and/or physical properties, e.g., refractive index, within the bulk of the glass.

SUMMARY

In one aspect, a method of making a fused silica plate comprises providing a cylindrical fused silica blank having a length, a longitudinal axis, and an outer diameter. The method further includes forming a slot in the fused silica blank which extends from the outer diameter to a location at or offset from a center of the fused silica blank and is substantially parallel to the longitudinal axis of the fused silica blank. The slot is defined by a concave surface located at or offset from the center of the fused silica blank, a first side surface extending between a first edge of the concave surface and the outer diameter of the fused silica blank, and a second side surface extending between a second edge of the concave surface and the outer diameter of the fused silica blank. At least one of the first and second side surfaces are connected to the concave surface by a chamfered surface. The method further includes rolling out the fused silica blank having the slot to form a fused silica plate.

In another aspect, the invention relates to a fused silica blank for forming a fused silica plate which comprises a cylindrical body having a length, a longitudinal axis, an outer diameter, and a slot formed in the cylindrical body. The slot extends from the outer diameter to a location at or offset from a center of the cylindrical body and is substantially parallel to the longitudinal axis. The slot is defined by a concave surface located at or offset from a center of the cylindrical body, a first side surface extending between a first edge of the concave surface and the outer diameter of the cylindrical body, and a second side surface extending between a second edge of the concave surface and the outer diameter of the cylindrical body. At least one of the first and second side surfaces is connected to the concave surface by a chamfered surface.

Other features and advantages of the invention will be apparent from the following description and the appended claims.

BRIEF DESCRIPTION OF THE DRAWINGS

The accompanying drawings, described below, illustrate typical embodiments of the invention and are not to be considered limiting of the scope of the invention, for the invention may admit to other equally effective embodiments. The figures are not necessarily to scale, and certain features and certain views of the figures may be shown exaggerated in scale or in schematic in the interest of clarity and conciseness.

DETAILED DESCRIPTION

The invention will now be described in detail with reference to a few preferred embodiments, as illustrated in the accompanying drawings. In describing the preferred embodiments, numerous specific details are set forth in order to provide a thorough understanding of the invention. However, it will be apparent to one skilled in the art that the invention may be practiced without some or all of these specific details. In other instances, well-known features and/or process steps have not been described in detail so as not to unnecessarily obscure the invention. In addition, like or identical reference numerals are used to identify common or similar elements.

Figure 1:
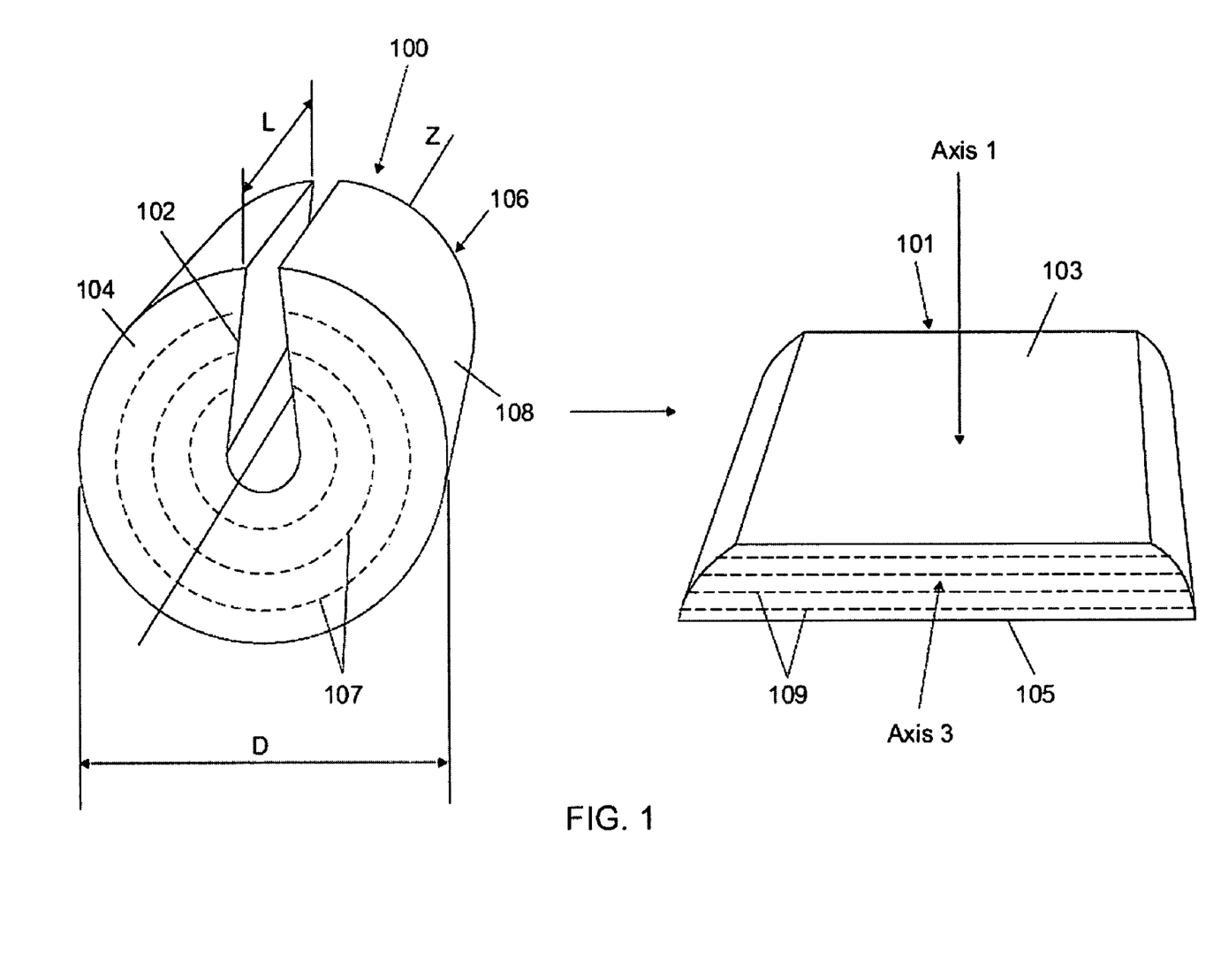
FIG. 1 is a perspective view of a glass blank having concentric, circular micro-striae adapted for reshaping into a glass plate having planar striae.

FIG. 1 depicts a glass blank 100 adapted for reshaping into a glass plate 101 with desirable properties in terms of micro-striae orientation and variations in composition, e.g., β-OH concentration, and/or physical properties, e.g., refractive index. The term "glass plate," as used herein is one having a flat plate-like geometry, i.e., one having at least two essentially parallel surfaces 103, 105 in opposing relation. Before reshaping, the glass blank 100 is in the form of a cylinder having a length L, an outer diameter D, and a longitudinal axis Z. In preferred embodiments, the glass blank 100 is a high purity fused silica glass. In some embodiments, the glass blank 100 may be made of other material besides silica. Fused silica glass blank 100 may be formed by reacting inorganic silicon precursor compounds, such as silicon halides, and/or organic silicon precursor compounds, such as octamethylcyclotetrasiloxane. In some embodiments, the fused silica glass blank 100 includes one or more dopants such as alkali metals and fluorine. In some embodiments, the glass blank 100 has micro-striae 107 which are circular and concentric about the longitudinal axis Z. Micro-striae are described herein as variations in composition and/or physical properties within the bulk of the glass which may affect performance of an optical element if oriented along the use axis of the optical element. In some embodiments, micro-striae are described as variations in β-OH concentration and/or refractive index within the bulk of the glass. Such micro-striae may affect performance of an optical element if oriented along the use axis of the optical element. After reshaping the glass blank 100, the concentric, circular micro-striae 107 are reoriented into planar striae 109. Although the invention may provide advantages when the glass blank 100 has concentric, circular micro-striae, it is not necessary that the glass blank 100 has concentric, circular micro-striae or any other observable micro-striae.

Figure 2:
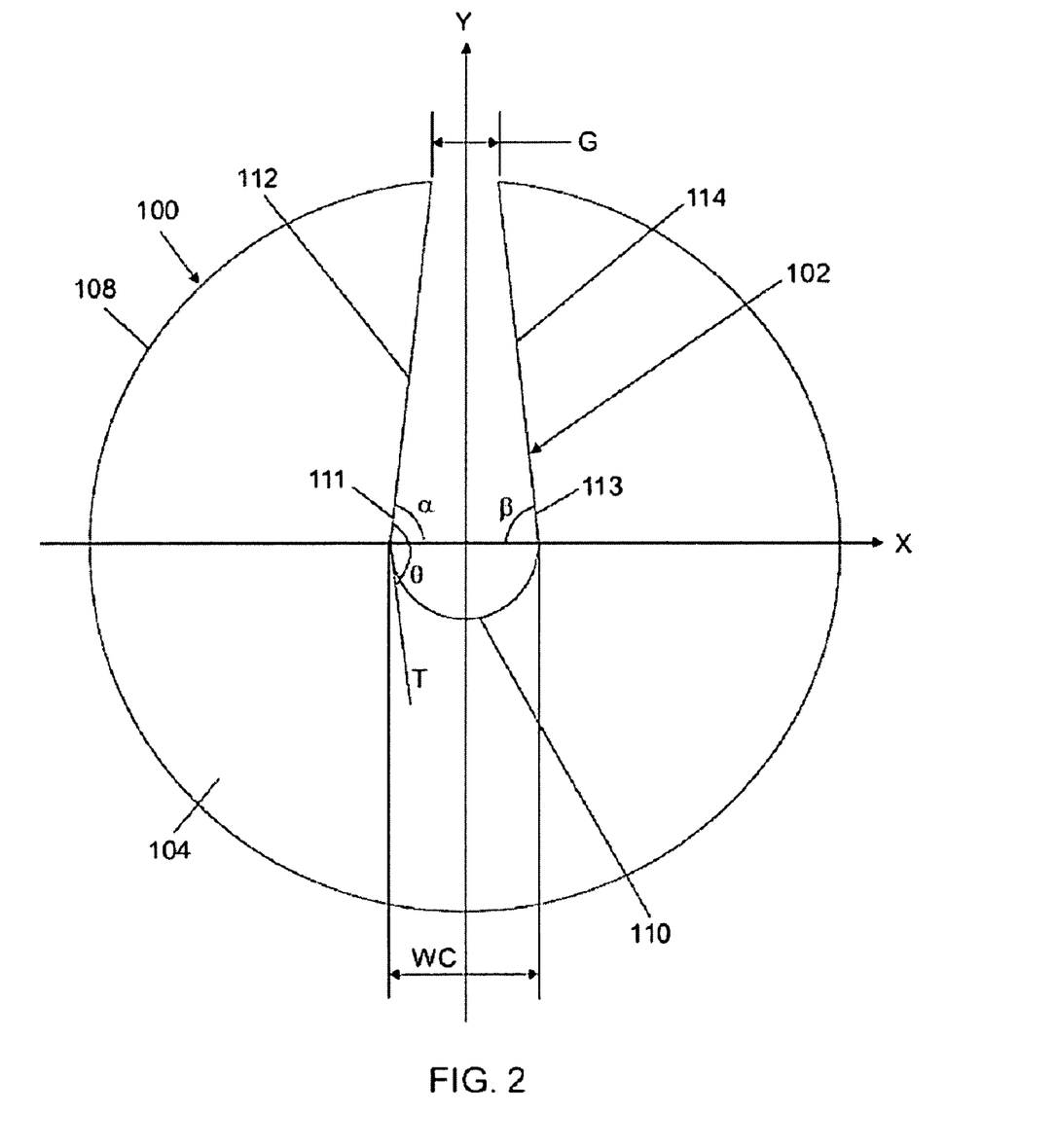
FIG. 2 is an end view of the glass blank of FIG. 1 depicting a radial slot in the glass blank with a concave surface connected to side surfaces through chamfered surfaces, where the side surfaces are aligned with the chamfered surfaces.

The cylindrical glass blank 100 is provided with a radial slot 102, which extends between a first plane 104 and a second plane 106 of the cylinder, where the first and second planes 104, 106 are perpendicular to the longitudinal axis Z and are in opposing relation to each other. The radial slot 102 begins at or near a center of the glass blank 100 and terminates on the outer surface 108 or outer diameter D of the glass blank 100. The radial slot 102 is substantially parallel or parallel to the longitudinal axis Z. Referring to FIG. 2, the slot 102 may be symmetrical or asymmetrical about the Y axis, which is orthogonal to the longitudinal axis of the glass blank 100. The slot 102 is defined by a combination of a concave surface 110, a first side surface 112, and a second side surface 114 formed within the glass blank 100. The concave surface 110 is located at or near the center of the glass blank 100 and extends longitudinally between the planes (104, 106 in FIG. 1) of the glass blank 100. The concave surface 110 may be viewed as a segment of a cylinder having a longitudinal axis substantially parallel to the longitudinal axis of the glass blank 100. The concave surface 110 may be concentric with the glass blank 100, i.e., have a common center (or longitudinal axis) with the glass blank 100, or may be eccentric with the glass blank 100, i.e., have a center (or longitudinal axis) offset from the center of the glass blank 100. In the example shown in FIG. 2, the concave surface 100 is concentric with the glass blank 100. The width WC of the concave surface 110 may be in a range from 10-50 percent of the outer diameter of the glass blank 100.

The first side surface 112 of the radial slot 102 extends from a first edge of the concave surface 110 and terminates at the outer surface 108 of the glass blank 100. The second side surface 114 of the slot 102 extends from a second edge of the concave surface 110 and terminates at the outer surface 108 of the glass blank 100. The first and second side surfaces 112, 114 extend between the concave surface 110 and the outer diameter of the glass blank 100. Like the concave surface 110, the side surfaces 112, 114 extend longitudinally between the planes (104, 106 in FIG. 1) of the glass blank 100. In this example, the side surfaces 112, 114 are inclined toward the center of the concave surface 110. In general, the dimensions and inclination of the side surfaces 112, 114 are such that there is a gap G between the tips of the side surfaces at the outer surface 108 (or outer diameter) of the glass blank 100. The gap G is less than width WC of the glass blank 100 and may be in a range from 5-50% of the outer diameter of the glass blank 100. The side surfaces 112, 114 are connected to the concave surface 110 through chamfered surfaces 111, 113. The chamfered surfaces 111, 113 are contiguous with the first and second edges of the concave surface 110 and with the side surfaces 112, 114, respectively. The chamfered surfaces 111, 113 substantially eliminate sharp corners or transitions between the concave surface 110 and the side surfaces 112, 114. This substantial elimination of sharp corners or transitions is beneficial to reorientation of micro-striae and homogenization of physical properties during reshaping of the glass blank 100 into a glass plate. In particular, the area of low curvature of the micro-striae in the glass blank 100 can be increased by eliminating the sharp corners at the junctions of side surfaces 112, 114 and concave surface 110.

The chamfered surfaces 111, 113 are beveled or inclined surfaces between the concave surface 110 and the side surfaces 112, 114. The chamfered surfaces 111, 113 are inclined inwardly from concave surface 110 toward the center of the concave surface 110. For convenience, the chamfer angles α, β are measured relative to a horizontal axis X, which is orthogonal to the longitudinal axis Z of the glass blank 100. The chamfer angles α, β are measured from the chamfered surfaces 111, 113, respectively, in a direction toward the center of the concave surface 110. The chamfer angles α, β are acute angles and may be in a range from 45° to 90°. The chamfer angles α, β may be the same or may be different from each other. The inner angles between the chamfered surfaces 111, 113 and the concave surface 110 may be equal to or less than 180°, preferably less than 180°. For illustration purposes, the inner angle θ between the concave surface 110 and the chamfered surface 111 is indicated in FIG. 2. The inner angle θ is measured from the chamfered surface 111 to a tangent T to the concave surface 110 at the intersection between the chamfered surface 111 and the concave surface 110. The inner angle θ is measured inwardly from the chamfered surface 111 in a direction toward the center of the concave surface 110, hence the term "inner angle." The same inner angle definition can be applied to the chamfered surface 113 and the concave surface 110. Optimal chamfer angles are determined by simulation of the flow of softened glass. Considering the optical element requirements and initial blank refractive index distribution an optimal pair of chamfers can be selected.

Figure 3:
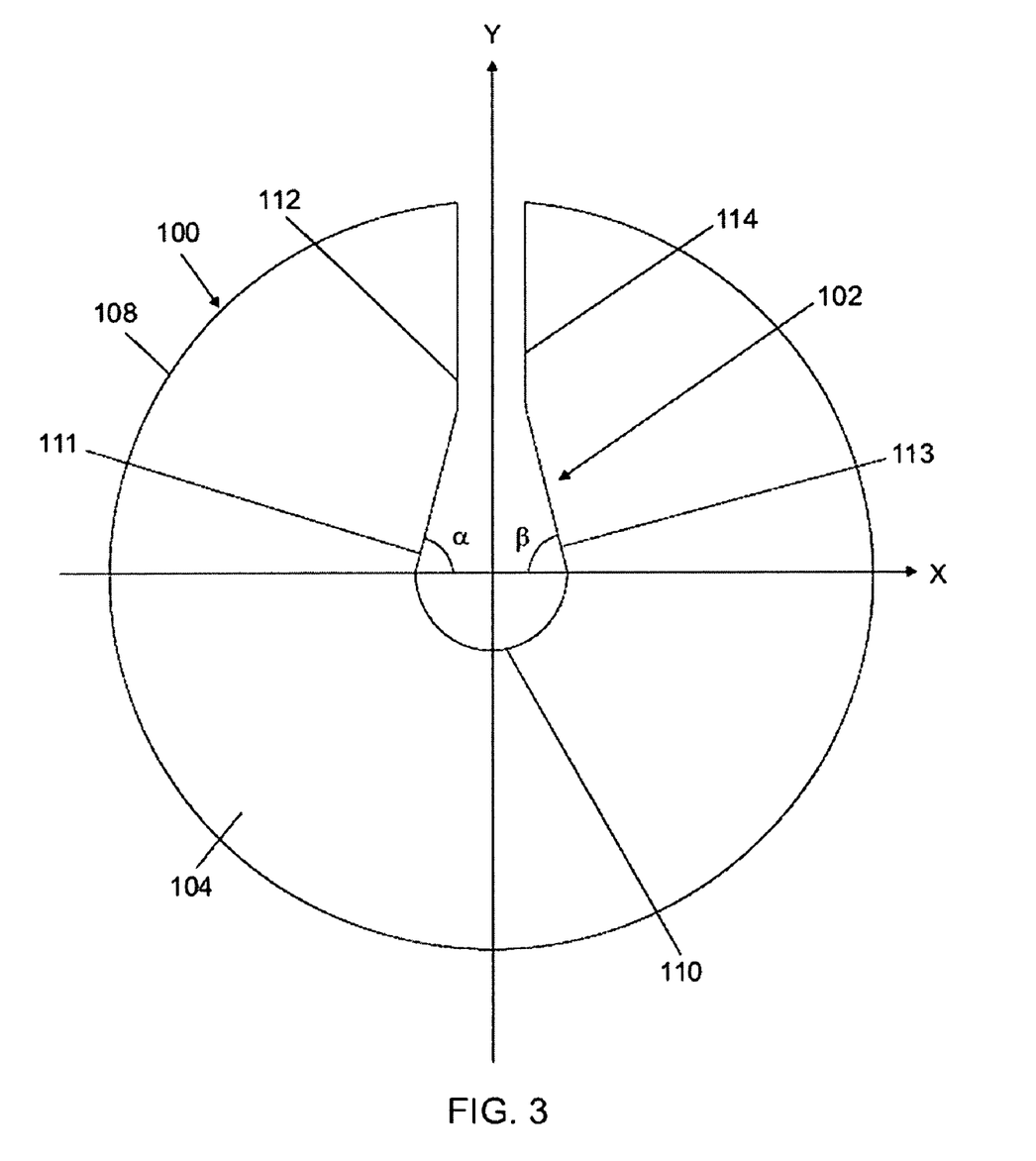
FIG. 3 is an alternative end view of the glass blank of FIG. 1 depicting a radial slot in the glass blank with a concave surface connected to side surfaces through chamfered surfaces, where the side surfaces are not aligned with the chamfered surfaces.
Figure 4:
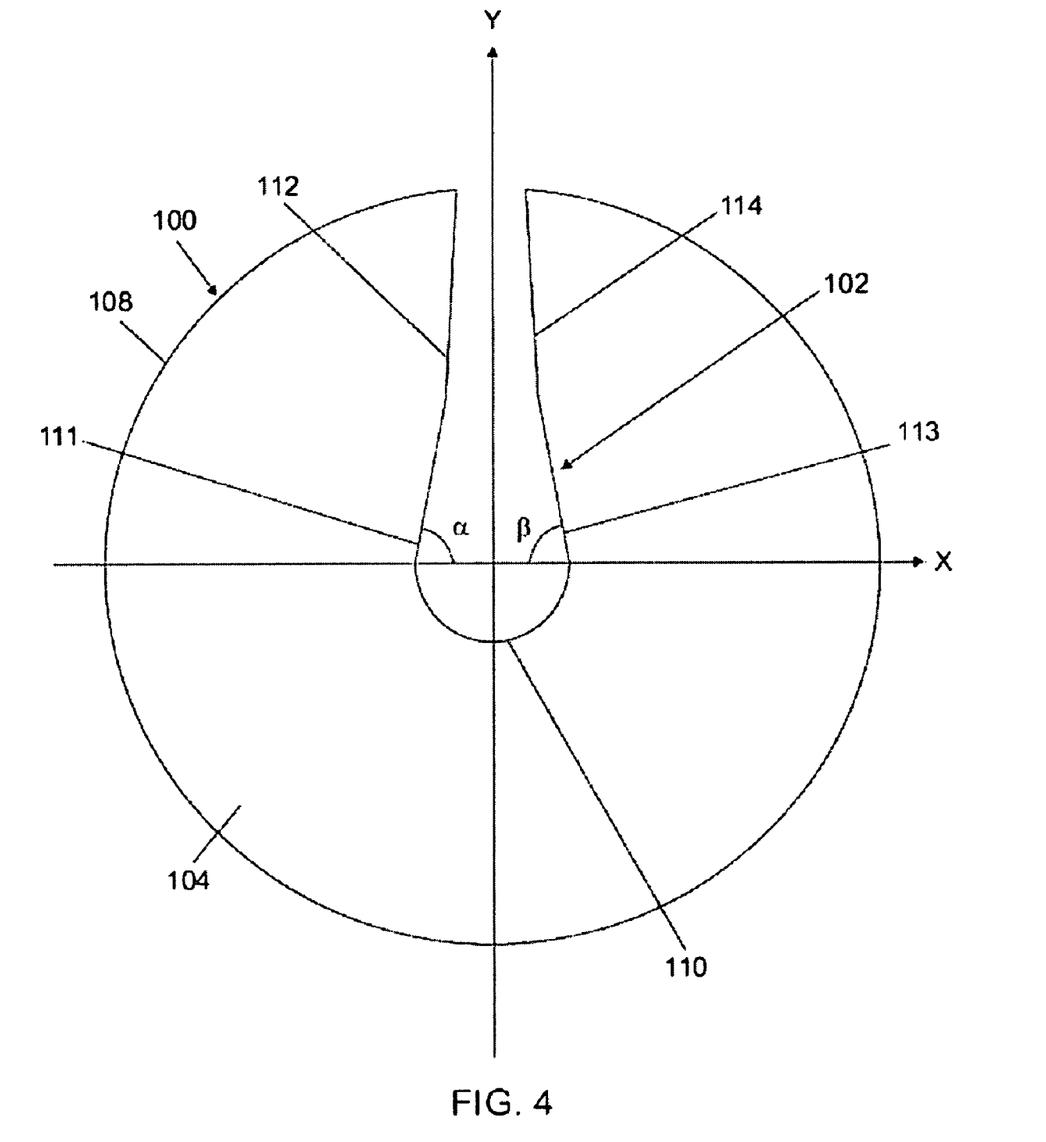
FIG. 4 is an alternative end view of the glass blank of FIG. 1 depicting a radial slot in the glass blank with a concave surface connected to side surfaces through chamfered surfaces, where the side surfaces are not aligned with the chamfered surfaces.

In the example shown in FIG. 2, the side surfaces 112, 114 are aligned with the chamfered surfaces 111, 113, i.e., the side surfaces 112, 114 are inclined to the horizontal axis X at the chamfer angles α, β, respectively. In alternate embodiments, the side surfaces 112, 114 are not aligned with, or are inclined to, the chamfered surfaces 111, 113. For example, the side surfaces 112, 114 may be perpendicular to the horizontal axis X, as shown in FIG. 3, or inclined at angles other than the chamfer angles α, β to the horizontal axis X, as shown in FIG. 4. In the alternate embodiments shown in FIGS. 3 and 4, the side surfaces 112, 114 remain connected to the concave surface 110 via the chamfered surfaces 111, 113 having chamfer angles α, β, as described above. Therefore, these embodiments also benefit from smooth transition in micro-striae reorientation and homogenization of physical properties when the glass blank 100 is reshaped. The smooth transition can be further enhanced by minimizing the inner angles between the side surfaces 112, 114 and the chamfered surfaces 111, 113, respectively, so that sharp transitions between these surfaces are minimized.

Figure 5:
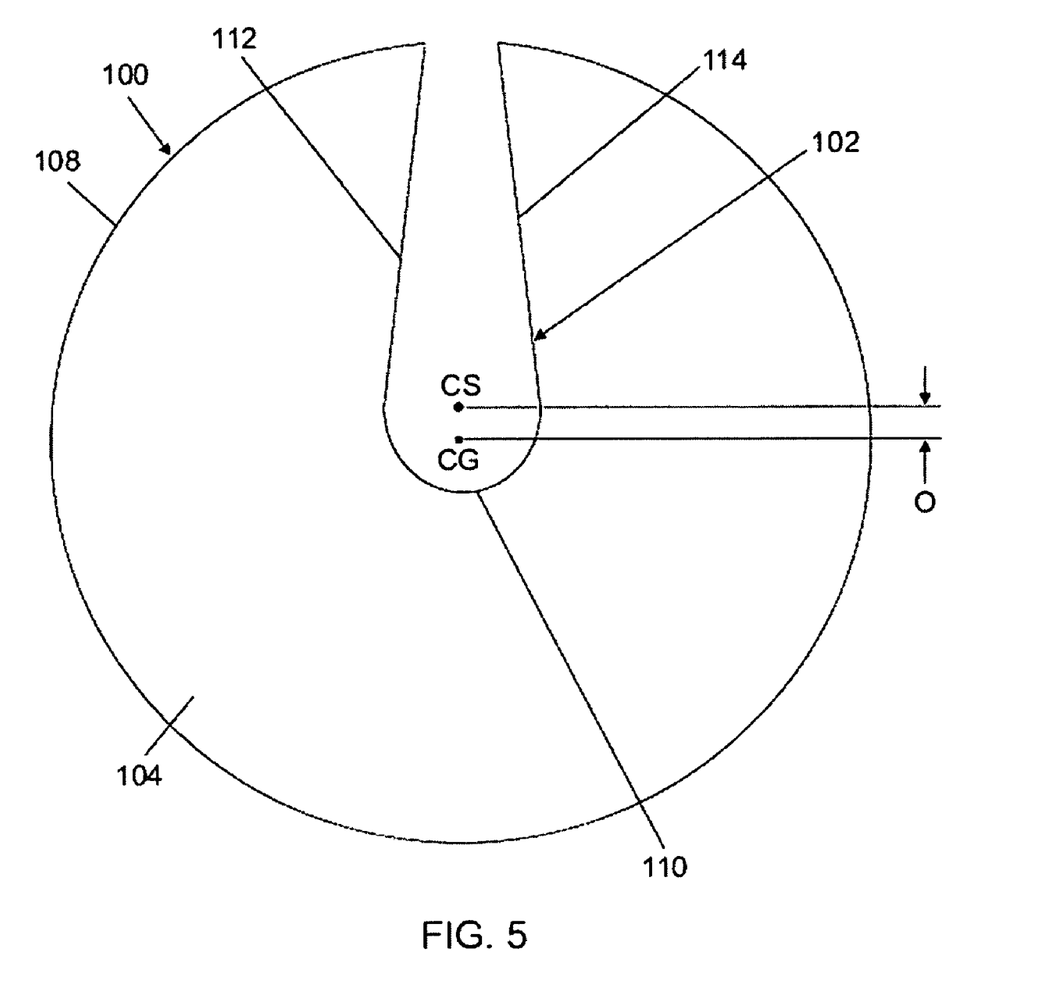
FIG. 5 depicts the end view of FIG. 2 with the concave surface of the radial slot eccentric with the glass blank.
Figure 6:
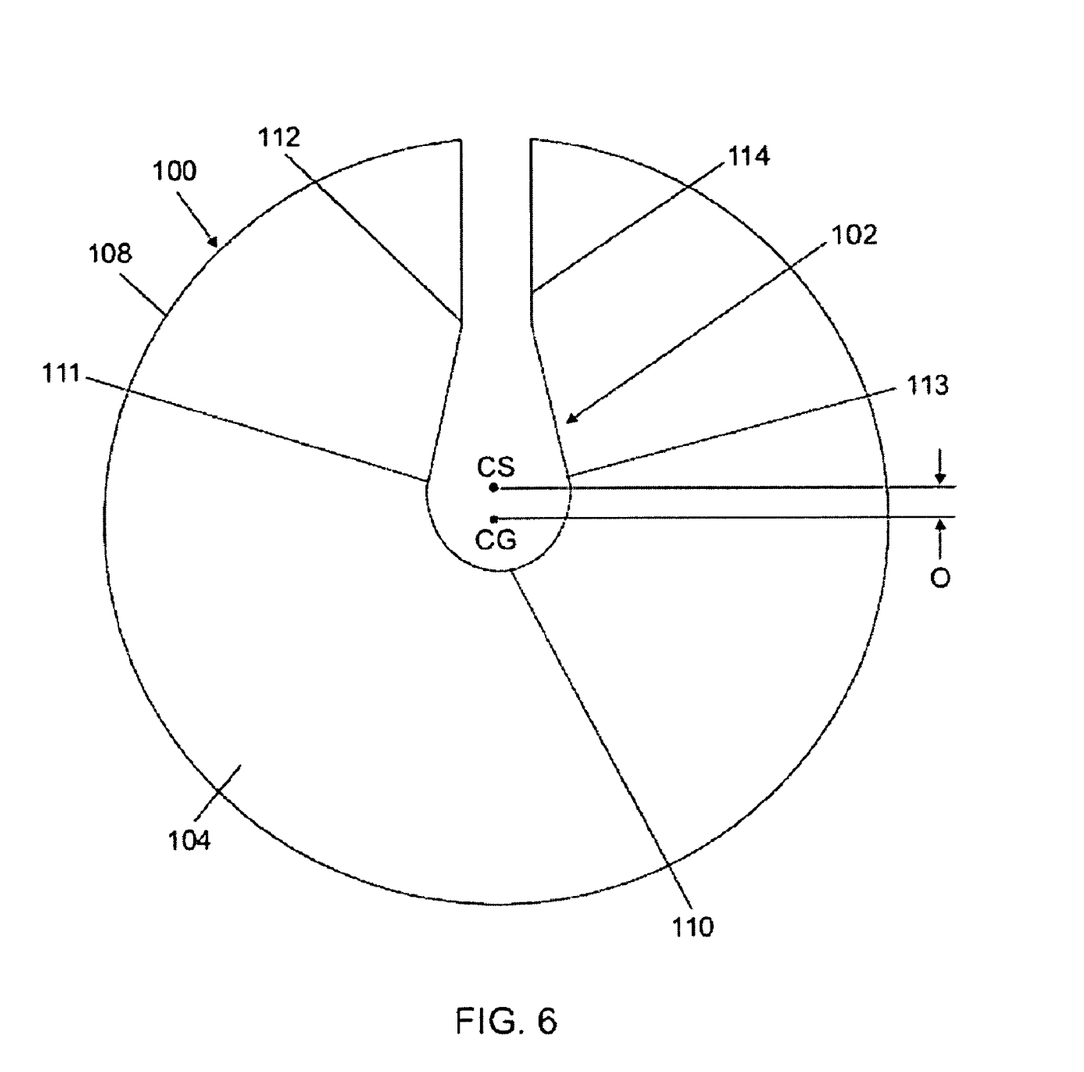
FIG. 6 depicts the end view of FIG. 3 with the concave surface of the radial slot eccentric with the glass blank.

In the embodiments illustrated in FIGS. 2-4, the concave surface 110 is concentric with the glass blank 100. That is, the concave surface 110 has a common center with the glass blank 100. In alternate embodiments, the concave surface 110 may be eccentric with the glass blank 100. FIG. 5 shows the example of FIG. 2 with the concave surface 110 eccentric with the glass blank 100, i.e., the center CS of the concave surface 110 is offset from the center CG of the glass blank 100. FIG. 6 shows the example of FIG. 3 with the concave surface 110 eccentric with the glass blank 100, i.e., the center CS of the concave surface 110 is offset from the center CG of the glass blank 100. In the examples shown in FIGS. 5 and 6, the center of the concave surface 110 may be shifted upward for example to minimize the overall height of the slot 102. This may translate to an increased usable thickness of the glass plate produced by reshaping of the glass blank 100. The offset O between the center CS of the concave surface 110 and the center CG of the glass blank 100 may be in a range from 0-25% of the outer diameter of the glass blank 100.

In preferred embodiments, the starting material for the glass blank 100 is a cylindrical glass preform made by a CVD process, such as OVD, IVD, or VAD. The CVD process may be plasma-assisted, as is known in the art. In other embodiments, the starting material for the glass blank 100 is a glass perform made by a non-CVD process such as the direct-to-glass process or a sol-gel process. Additional processing steps may be used to draw or otherwise shape a cylindrical or non-cylindrical glass preform before providing the preform for use as the glass blank 100. For example, glass preforms made by CVD processes tend to be long and slender. To make thick glass plates from these preforms, it may be desirable to increase the thickness of the preform. In some embodiments, thickening of the preform is achieved by a thermal reflow process in which the glass preform is placed in a crucible, which is then placed into a furnace. Weight can be optionally placed on the glass preform in a direction along the longitudinal axis of the glass preform. The furnace is heated to a reflow temperature, such as, for example, the softening point or a temperature that is greater than the softening point of the glass, where the glass reflows under the influence of its own gravity and optionally the weight placed on the glass preform. The reflow temperature may be in a range from 1400° C. up to about 1900° C. for fused silica glass. At the end of the reflow process, the glass preform has a shorter length than the original length and a larger diameter than the original diameter, i.e., the glass preform has been "squashed." However, the thermal reflow process does not change the orientation of the micro-striae in the glass. That is, if the glass had concentric, circular striae before the reflow process, it should maintain the concentric, circular striae after the reflow process.

To provide the cylindrical glass blank 100, a desired piece is cut from the cylindrical glass preform. Then, the slot 102 is machined in the cylindrical glass preform section. Any suitable machining process may be used to form the slot 102. Examples of machining processes include diamond abrasive grinding/milling, abrasive wiresaw and band slicing, abrasive water jet machining, and the like. After machining the slot 102 in the cylindrical glass preform section, the resulting cylindrical glass blank 100 is preferably subjected to a cleaning step to remove any residual contamination from machining and handling of the blank. In some embodiments, the cleaning step includes rinsing the glass blank 100, with the slot formed therein, in distilled or de-ionized water. The glass blank 100 is then acid cleaned using, for example, hydrochloric acid, for about 16 hours at room temperature. The acid cleaned glass blank 100 is then air dried. Alternatively, the glass blank 100 may be cleaned using organic solvents acid etching with hydrofluoric acid, or both.

It is also possible to form the slot 102 directly in the glass preform. For example, OVD involves depositing soot, e.g., silica soot, on the outside surface of an axially rotating mandrel to form a cylindrical soot preform, which is later consolidated into a glass preform. The mandrel may be configured to include a positive shape of the slot 102 such that when the mandrel is removed from the preform, e.g., after consolidating the preform, the slot 102 is already formed in the preform. In this case, the mandrel may be formed of glass material having a different composition than the preform material and may be later removed from the preform by drilling or other suitable processes. Other CVD processes such as IVD and VAD may be similarly adapted to allow formation of the slot 102 directly in the preform. Where the slot 102 is formed directly in the cylindrical perform, sections of the cylindrical preform may be cut as necessary to provide the glass blank 100.

Figure 7:
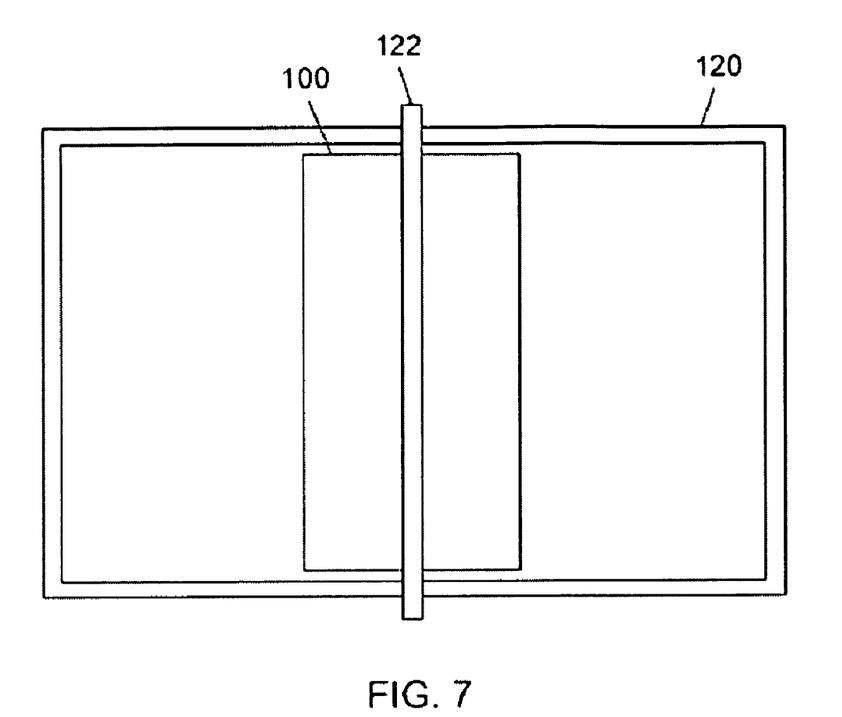
FIG. 7 is a top view of a roll-out setup.
Figure 8:
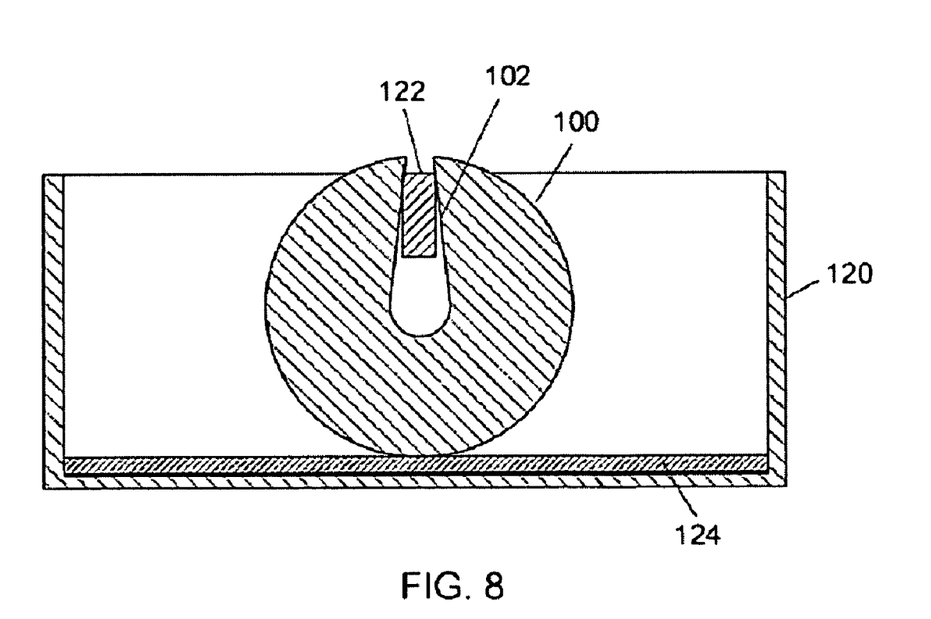
FIG. 8 is a front view of the roll-out setup depicted in FIG. 7.

In some embodiments of the invention, a roll-out process is used to reshape the cylindrical glass blank 100 into a flat plate 101, as illustrated in FIG. 1. Referring to FIGS. 7 and 8, the roll-out process involves placing the glass blank 100 in a container 120 suitable for thermal processing. As an example, the container 120 may be a purified graphite crucible. The glass blank 100 is placed in the container 120 such that the slot 102 is oriented in a vertical direction. One or more setter plates 122 may be used to orient the glass blank 100 such that the slot 102 is oriented in the vertical direction. Where a purified graphite crucible is used as the container 120, liner material 124 made of refractory material, such as Zirconia, may be inserted between the glass blank 100 and the container 120 to inhibit $SiO_2$-carbon reactions. The liner material 124 may be porous to allow for escape of gaseous species. As an example, the liner material 124 may be a felt material that is non-reactive and non-wetting with $SiO_2$. Alternatively, the liner material 124 may be a rigid material that is non-reactive and non-wetting with $SiO_2$, where the rigid material may incorporate pores for escape of gaseous species. The container 120 and liner material 124 may be coated to further minimize their reaction with or contamination of the glass blank 100. Refractory materials such as molybdenum and tungsten, ceramic materials such as stabilized zirconia, zirconia silica, silicon carbide, alumina, and coating materials such as boron nitride, yttrium oxide, and carbon may be used.

The roll-out process includes loading the container 120 with the glass blank 100 into a furnace and heating the glass blank 100 to an elevated temperature to induce softening and stretching of the glass. The elevated temperature may be on the order of 1400° C. up to about 1900° C. In some embodiments of the invention, the elevated temperature is in a range of about 1720° C. up to 1800° C. The glass blank 100 is held at the elevated temperature for a time period. In silica glass with nominal β-OH concentrations up to 500 ppm, the glass may be held for 3 to 4 hours at 1720° C. to 1800° C. Heating rates may be from 50° C./hr to 600° C./hr above the glass annealing point to the maximum temperature useful for roll-out. Higher ramp rates, e.g., 100° C./hr to 600° C./hr, are generally more effective in stretching the center portion of the glass during the roll-out. At temperatures between the annealing point and devitrification range, a hold temperature may be employed to yield more uniform temperature throughout the glass blank. Temperature holds between 1200° C. to 1500° C. from 30 minutes to 2 hours, depending on the size of the glass blank, may be used.

In some embodiments of the invention, the container 120 is loaded into a resistively-heated graphite furnace and heated in the presence of a nitrogen-containing atmosphere and, depending on the desired process purity, with or without chlorine gas. Alternatively, other inert gases such as helium or argon may be provided in the furnace during the thermal treatment. Pressure levels of approximately 10 mbar to above atmospheric may be provided in the furnace during the thermal processing. These parameters are examples found to provide useful rolled-out silica glass plate and are not intended to limit the invention as otherwise described herein. The roll-out process may be mechanically assisted. For example, the glass blank 101 may be rolled out via the assistance of an articulating mandrel and a plunger inserted into the slot 102. During the initial stage of the roll-out, the glass blank 101 would be pressed open via the assistance of the mandrel and the plunger. Subsequently, the partially rolled-out glass having a larger opening would be allowed to reflow to substantially a flat plate-like geometry, as described above. Mechanical assistance can shorten the total roll-out time. After the roll-out process, the blank can be annealed and ground to the required shape, size and surface finish.

As illustrated in FIG. 1, the roll-out process involves rolling out a cylindrical glass blank 100 into a flat plate-like geometry 101. During the roll-out process, the concentric circular striae 107 of the cylindrical glass blank 100 are reflowed and reoriented into planar striae 109 in the glass plate 101. The planar striae 109 is substantially parallel to the surfaces 103, 105 of the glass plate 101 and substantially perpendicular to the thickness of the glass plate 101. If the optical axis or use direction of an optical element made from the glass plate 101 is chosen to be along the thickness of the glass plate 101, i.e., along Axis 1, then the planar striae 109 would be normal to the optical axis or use direction of the optical element. The overall result is that there would be essentially no observable striae when viewed in the use direction or optical axis of the optical element. The slot (102 in FIGS. 1-6) having the chamfered surfaces (111, 113 in FIGS. 2-6) allows the concentric, circular striae 107 to be reoriented into the planar striae 109 without observable or with minimum discontinuities. The roll-out process realigns the β-OH radial gradient such that the gradient is averaged through the thickness of the final part. This minimizes the impact of β-OH radial gradient on final index homogeneity along the thickness of the final part.

Figure 9:
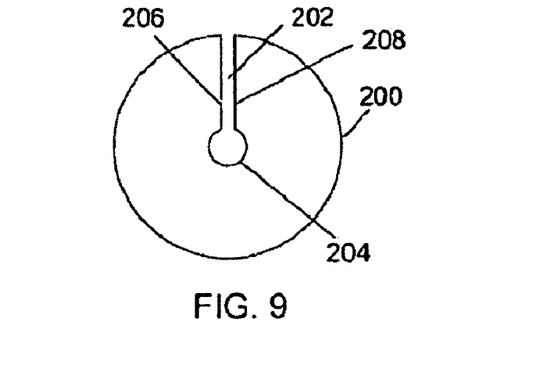
FIG. 9 shows a glass blank having a slot with non-chamfered surfaces for comparison purposes.
Figure 10A:
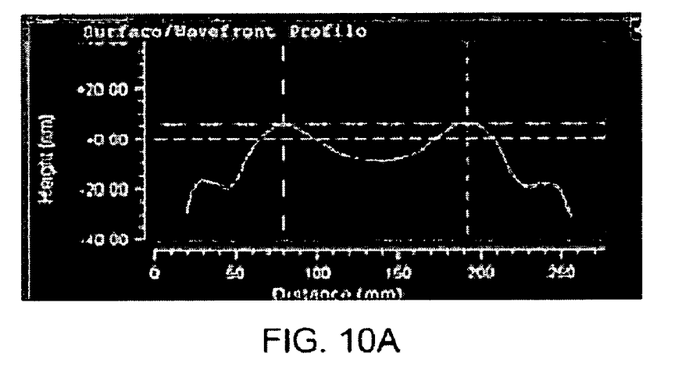
FIGS. 10A-10C depict refractive homogeneity profiles for a flat plate rolled out from the glass blank of FIG. 9.
Figure 10B:
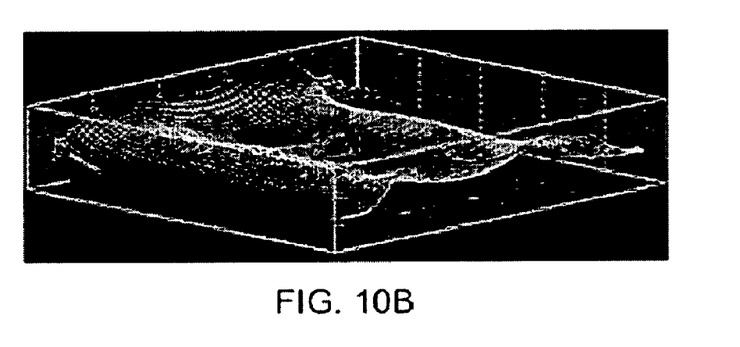
Figure 10C:
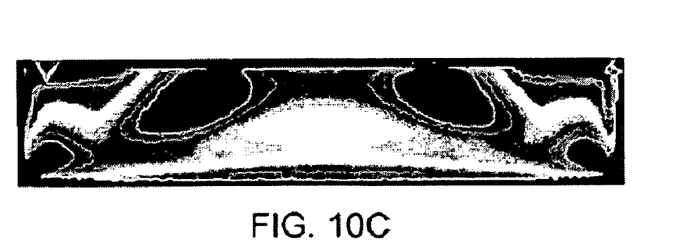
Figure 11A:
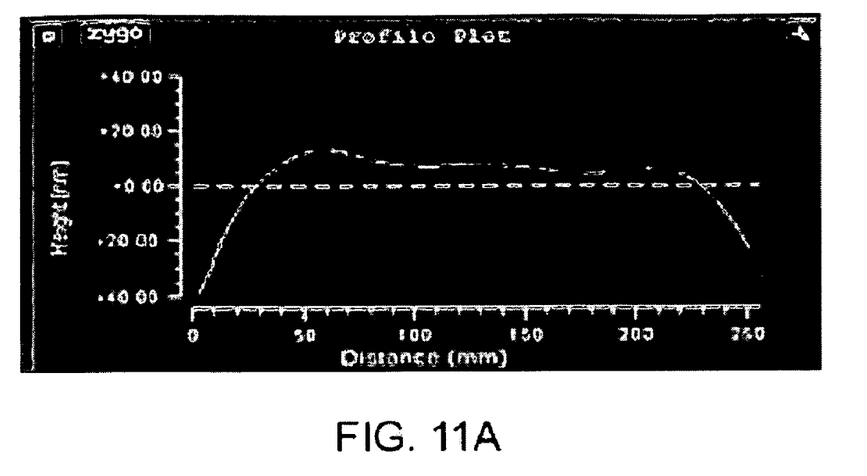
FIGS. 11A-11C depict refractive homogeneity profiles for a flat plate rolled out from the glass blank of FIG. 2.
Figure 11B:
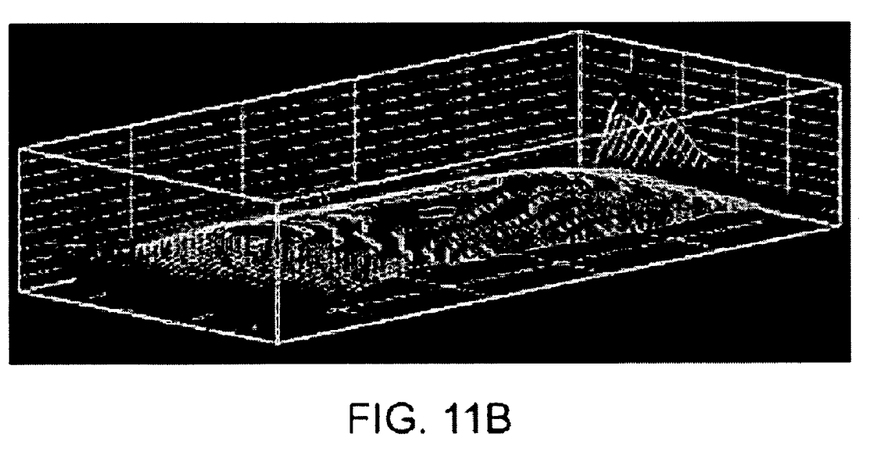
Figure 11C:
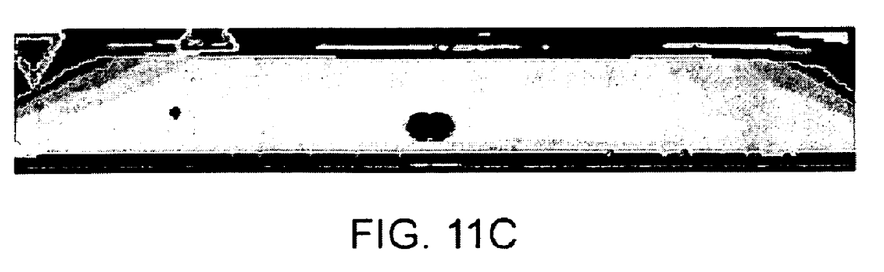
Figure 12A:
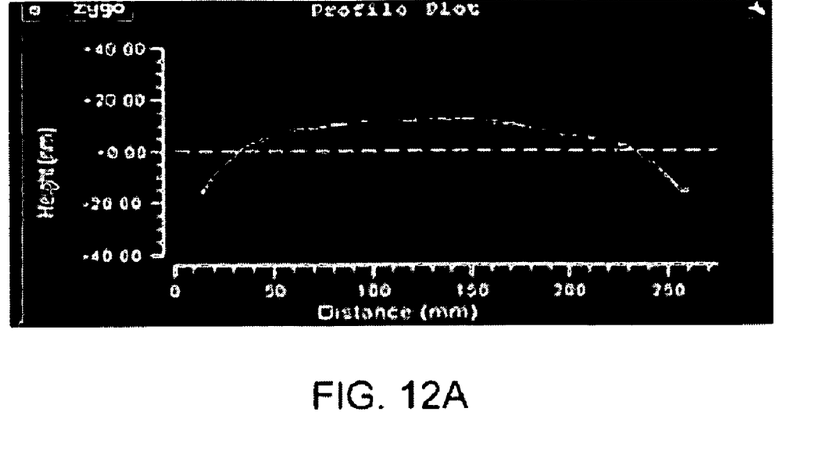
FIGS. 12A-12C depict refractive homogeneity profiles for a flat plate rolled out from the glass blank of FIG. 3.
Figure 12B:
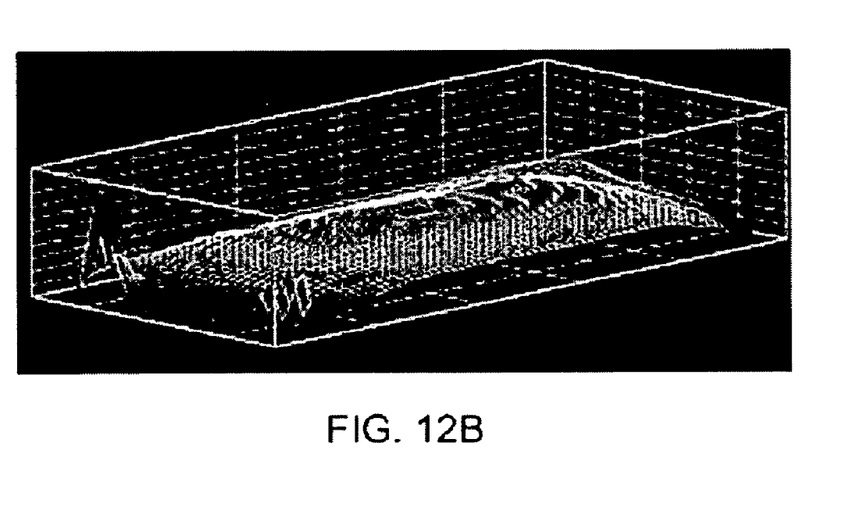
Figure 12C:
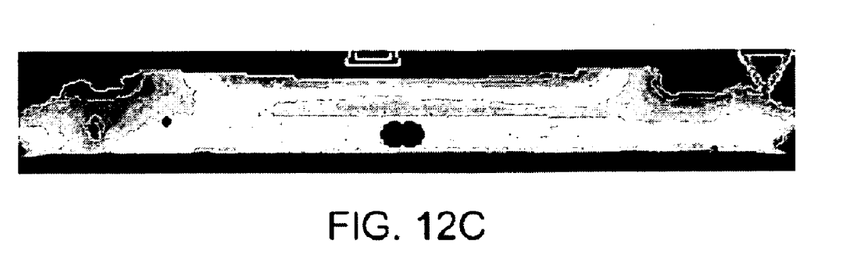

FIG. 9 shows a glass blank 200 with a slot 202 not having chamfered surfaces between a concave surface 204 and side surfaces 206, 208, as described above. FIG. 10A is a line plot of refractive index homogeneity profile for a flat plate rolled out from the glass blank 200, taken at the middle of Axis 1 (i.e., through the blank thickness; Axis 1 is indicated in the drawing of FIG. 1). FIG. 10B is a surface plot of refractive index homogeneity for a flat plate rolled out from the glass blank 200, taken along Axis 1 (i.e., through the blank thickness). The refractive index homogeneity profiles of the roll-out geometry shown in FIGS. 10A and 10B reveal the presence of wings (humps) in Axis 1, which limit the extractable part diameter. FIG. 10C is a surface plot of refractive index homogeneity profile for a flat plate rolled out from the glass blank 200, taken along Axis 3 (i.e., through the blank length; Axis 3 is indicated in the drawing of FIG. 1). The refractive index homogeneity profiles of the roll-out geometry shown in FIG. 10C is generally U- or W-shaped, as shown by the lighter lines surrounding the darker spots in the middle top area. The two dark spots correspond to two wings present in Axis 1. FIGS. 11A, 11B, 11C show refractive index homogeneity profiles corresponding to FIGS. 10A, 10B, 10C, respectively, for a flat plate rolled out from a glass blank as shown in FIG. 2. FIGS. 12A, 12B, 12C show refractive index homogeneity profiles corresponding to FIGS. 10A, 10B, 10C, respectively, for a flat plate rolled out from a glass blank as shown in FIG. 3. These figures show that rolled-out geometries according to embodiments of the invention exhibit more uniform, flatter, refractive index homogeneity profiles. For example, the FIGS. 11A and 12A show the absence of wings (humps) that were characteristic of the glass blank (200 in FIG. 9) having a non-chamfered slot (202 in FIG. 9).

Figure 13:
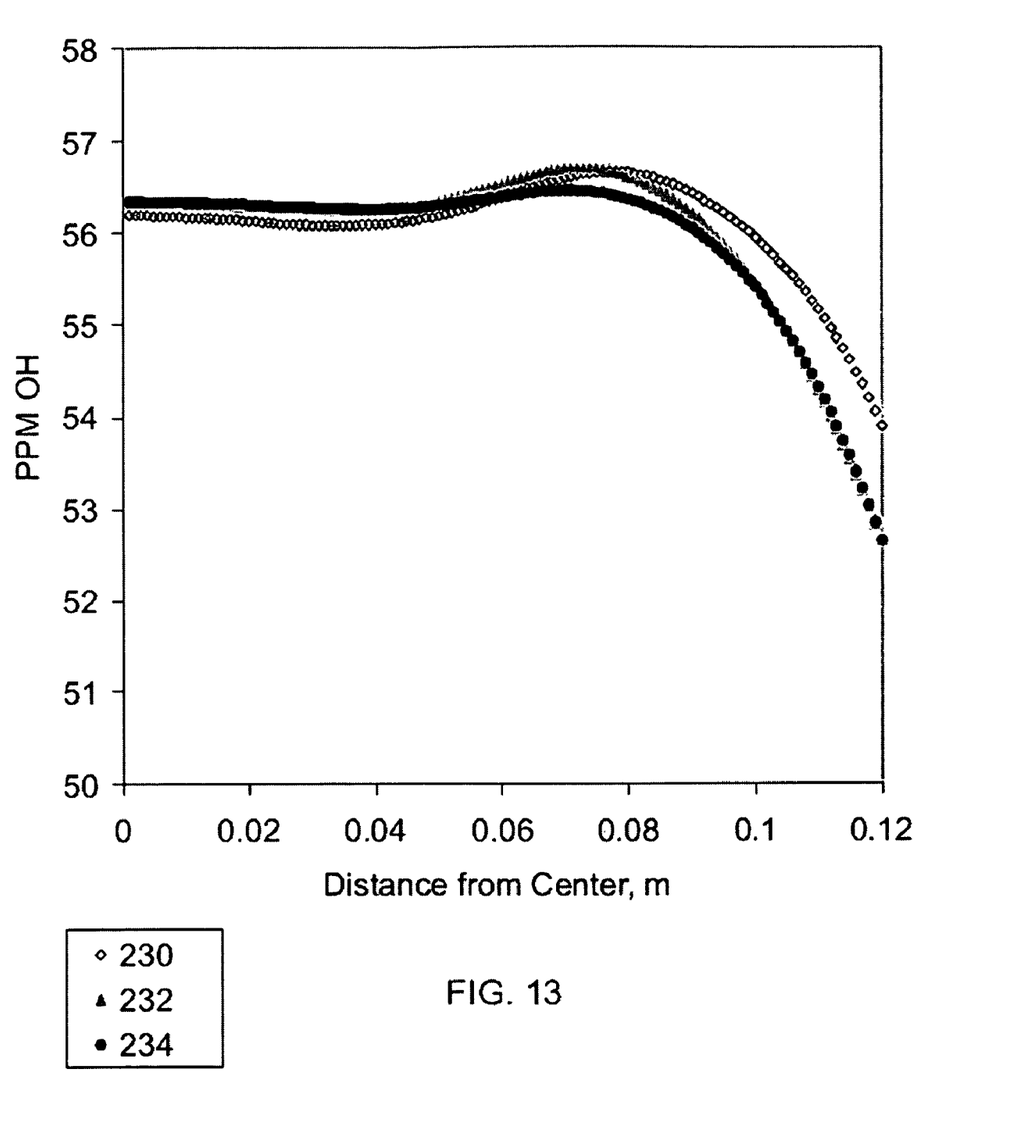
FIG. 13 is a comparison of β-OH distribution for a flat plate rolled out from the glass blank of FIG. 9, and a variation thereof, and a flat plate rolled out from the glass blank of FIG. 6.

FIG. 13 compares β-OH distribution for a flat plate rolled out from a glass blank as shown in FIG. 9 (230), for a flat plate rolled out from a glass blank as shown in FIG. 9, but with the concave portion of the slot offset from the center of the glass blank (232), and for a flat plate rolled out from a glass blank as shown in FIG. 6 (234). A 5-10 ppm change in β-OH concentration produces a change of about 1 ppm in refractive index. The lower the absolute β-OH level of a glass is, the more sensitive is the refractive the index to changes in β-OH concentration. For example, a change of about 5 ppm β-OH in glass having a β-OH concentration of 60 ppm produces a change in refractive index of about 1 ppm, whereas a change of about 10 ppm β-OH produces a change in refractive index of about 1 ppm index change in glass having a β-OH concentration of 900 ppm.

In some embodiments of the invention, a glass plate 101 formed from a glass blank 100 as described above and a roll-out process as described above has an index profile in a range of up to 1.0 ppm, preferably less than or equal to 0.5 ppm, more preferably equal to about 0.3 ppm, over an aperture size of up to 95% of the face dimension of the glass plate 101. Further, the index profile is substantially free of rotational symmetry. Further, the glass plate 101 has a birefringence profile in which the index homogeneity is less than or equal to 2 nm/cm over an aperture size of up to 95% of the face dimension of the glass plate. Further, the fast axis directions of the birefringence profile are substantially free of dominant tangential or radial patterns.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of making a fused silica plate comprising the steps of:

provinding a cylindrical fused silica blank having a length, a longitudinal axis, and an outer diameter;

forming a slot in the fused silica blank which extends from the outer diameter to a location at or near a center of the fused silica blank and is substantially parallel to the longitudinal axis, the slot being defined by a concave surface located at or near the center of the fused silica blank, a first side surface extending between a first edge of the concave surface and the outer diameter of the fused silica blank, and a second side surface extending between a second edge of the concave surface and the outer diameter of the fused silica blank, at least one of the first and second side surfaces being connected to the concave surface by a chamfered surface, the chamfered surface being inclined inwardly from the concave surface toward a center of the concave surface, wherein a width of the slot measured at the outer diameter of the cylindrical fused silica blank is smaller than a width of the slot measured at an intersection between the chamfered surface and the concave surface; and rolling out the fused silica blank having the slot to form the fused silica plate.

2. The method of claim 1, wherein both of the first and second side surfaces are connected to the concave surface by chamfered surfaces.

3. The method of claim 2, wherein the chamfered surfaces are inclined inwardly from the concave surface toward a center of the concave surface.

4. The method of claim 2, wherein the chamfered surfaces provide a substantially smooth transition between the concave surface and the first and second side surfaces.

5. The method of claim 2, wherein the first and second side surfaces are each aligned with an adjacent one of the chamfered surfaces.

6. The method of claim 2, wherein the first and second side surfaces are each inclined toward the concave surface relative to an adjacent one of the chamfered surfaces.

7. The method of claim 1, wherein the concave surface is concentric with the fused silica blank.

8. The method of claim 1, wherein the concave surface is eccentric with the fused silica blank.

9. The method of claim 1, wherein the step of rolling out the fused silica blank comprises orienting the fused silica blank such that the slot is oriented in a vertical direction and facing upward.

10. The method of claim 9, wherein rolling out the fused silica blank further comprises softening and stretching the fused silica blank.

11. The method of claim 1, wherein the fused silica plate has a refractive index profile that is substantially free of rotational symmetry.

12. The method of claim 1, wherein the step of rolling out the fused silica blank comprises at least one of reorienting and reshaping micro-striae to obtain a predetermined index homogeneity level.

13. The method of claim 12, wherein the step of rolling out the fused silica blank comprises reorienting concentric, circular micro-striae in the cylindrical glass blank into planar striae in the fused silica plate.

14. The method of claim 1, wherein the step of providing a cylindrical fused silica blank further comprises thermally reflowing the fused silica blank at a reflow temperature to form a reflowed blank having a length less than the length of the fused silica blank and an outer diameter greater than the outer diameter of the fused silica blank.

15. A fused silica blank for forming a fused silica plate comprising:

a cylindrical body having a length, a longitudinal axis, and an outer diameter and a slot formed in the cylindrical body, the slot extending from the outer diameter to a location at or near a center of the cylindrical body and being substantially parallel to the longitudinal axis, the slot being defined by a concave surface located at or near a center of the cylindrical body, a first side surface extending between a first edge of the concave surface and the outer diameter of the cylindrical body, and a second side surface extending between a second edge of the concave surface and the outer diameter of the cylindrical body, at least one of the first and second side surfaces being connected to the concave surface by a chamfered surface, wherein the chamfered surface is inclined inwardly from the concave surface toward a center of the concave surface, wherein a width of the slot measured at the outer diameter of the cylindrical body is smaller than a width of the slot measured at an intersection between the chamfered surface and the concave surface.

16. The fused silica blank of claim 15, wherein both of the first and second side surfaces are connected to the concave surface by chamfered surfaces.

17. The fused silica blank of claim 16, wherein the chamfered surfaces substantially eliminate sharp edges at junctions between the concave surface and the first and second side surfaces.

18. The fused silica blank of claim 16, wherein the first and second side surfaces are each aligned with an adjacent one of the chamfered surfaces.

19. The fused silica blank of claim 16, wherein the concave surface is concentric with the cylindrical body.

20. The fused silica blank of claim 16, wherein the concave surface is eccentric with the fused silica blank.

* * * * *